US007234608B2

(12) United States Patent
Reed et al.

(10) Patent No.: US 7,234,608 B2
(45) Date of Patent: Jun. 26, 2007

(54) SPILL CONTAINMENT ASSEMBLY

(75) Inventors: Timothy D. Reed, Solon, OH (US); Douglas M. Horner, Gates Mills, OH (US); Thomas G. Carter, Kent, OH (US); Scott Janda, Bainbridge, OH (US)

(73) Assignee: Polymer & Steel Technologies Holding Company, L.L.C., Eastlake, OH (US)

( * ) Notice: Subject to any disclaimer, the term of this patent is extended or adjusted under 35 U.S.C. 154(b) by 0 days.

(21) Appl. No.: 10/368,849

(22) Filed: Feb. 19, 2003

(65) Prior Publication Data

US 2004/0159664 A1  Aug. 19, 2004

(51) Int. Cl.
*B65D 1/34* (2006.01)
*B65D 25/00* (2006.01)

(52) U.S. Cl. .............. 220/571; 220/560.03; 220/9.4; 383/33; 383/113

(58) Field of Classification Search ........ 220/571–573, 220/495.06, 495.08, 9.1–9.4, 23.9, 560.03, 220/653; 383/33, 119, 109, 113, 120; 137/312
See application file for complete search history.

(56) References Cited

U.S. PATENT DOCUMENTS

| | | | | |
|---|---|---|---|---|
| 1,086,002 A | * | 2/1914 | Stewart | .................. 141/390 |
| 3,495,762 A | * | 2/1970 | Verbic | ..................... 383/120 |
| 4,750,669 A | * | 6/1988 | Leight | .................. 229/125.02 |
| 4,988,235 A | * | 1/1991 | Hurley | ....................... 405/50 |
| 5,350,241 A | * | 9/1994 | Zoland | ..................... 383/127 |
| 5,762,233 A | | 6/1998 | Van Romer | |
| 5,921,427 A | * | 7/1999 | Giannone et al. | ...... 220/495.06 |
| 6,026,646 A | * | 2/2000 | Hansen et al. | ................ 62/3.6 |
| 6,050,663 A | * | 4/2000 | Schoellmann | ............... 312/408 |
| 6,126,124 A | * | 10/2000 | Wagner | ..................... 248/127 |
| 6,315,143 B1 | * | 11/2001 | Dotts | ......................... 220/9.2 |
| 6,336,342 B1 | * | 1/2002 | Zeddies | ..................... 62/457.2 |
| 6,349,656 B1 | | 2/2002 | Mitchell | |
| 6,390,154 B1 | * | 5/2002 | Hall | ........................... 141/314 |
| 6,427,475 B1 | * | 8/2002 | DeFelice et al. | ............ 62/457.2 |
| 6,626,006 B1 | * | 9/2003 | Tedder | ...................... 62/457.7 |
| 6,941,703 B2 | * | 9/2005 | MacLean et al. | .............. 52/34 |

* cited by examiner

*Primary Examiner*—Anthony D. Stashick
*Assistant Examiner*—Niki M. Eloshway
(74) *Attorney, Agent, or Firm*—Rankin, Hill, Porter & Clark LLP

(57) ABSTRACT

A spill containment assembly includes a support structure or grate, and a flexible containment bag disposed beneath, and secured to, the grate. Fluid filled containers are placed on the grate. The bag defines an available containment volume sufficient to retain a quantity of liquid stored within the containers supported by the grate.

18 Claims, 5 Drawing Sheets

SPILL CONTAINMENT ASSEMBLY

BACKGROUND OF THE INVENTION

1. Field of the Invention

The present invention is directed generally toward a spill containment assembly and, more particularly, toward a self-supporting flexible spill containment assembly.

2. Description of Related Art

Drums or vessels are commonly used to store fluids. These fluid filled drums or vessels can sometimes leak or spill their fluid contents during use or storage. It is desirable to contain such spilled or leaked fluid so as to reduce the risk of damage or injury that such fluids may cause.

Spill containment assemblies are used as secondary containment vessels to contain and temporarily store fluid that has been spilled or leaked. Unfortunately, these spill containment assemblies can be cumbersome to use and can be bulky to store or transport.

Therefore, there exists a need in the art for a spill containment assembly that is easily assembled and that is relatively portable and convenient to dissemble to, for example, ship or store.

SUMMARY OF THE INVENTION

The present invention is directed toward a spill containment assembly that can be relatively easily assembled, disassembled, shipped and stored.

In accordance with the present invention, the spill containment assembly includes a support structure or grate and a flexible containment bag disposed beneath, partially surrounding, and secured to the grate. The grate thus supports the bag and cooperates with the bag to define an available containment volume sufficient to retain a quantity of fluid.

In accordance with an aspect of the invention, legs attach to and support the grate. The bag attaches to the grate, which thus supports the bag. Sidewalls of the bag extend from the grate downward toward the floor. The bag sidewalls have a height about equal to a vertical height of the bag. Accordingly, the height of the legs influences the containment volume of the bag. Accordingly, the leg height is selected so that a desired containment volume is created in the bag. In accordance with one desired construction, containment volume is equal to or larger than 110% of a fluid volume of a vessel placed on the grate, and equal to or larger than 50% of a total fluid volume of all of the vessels placed on the grate.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
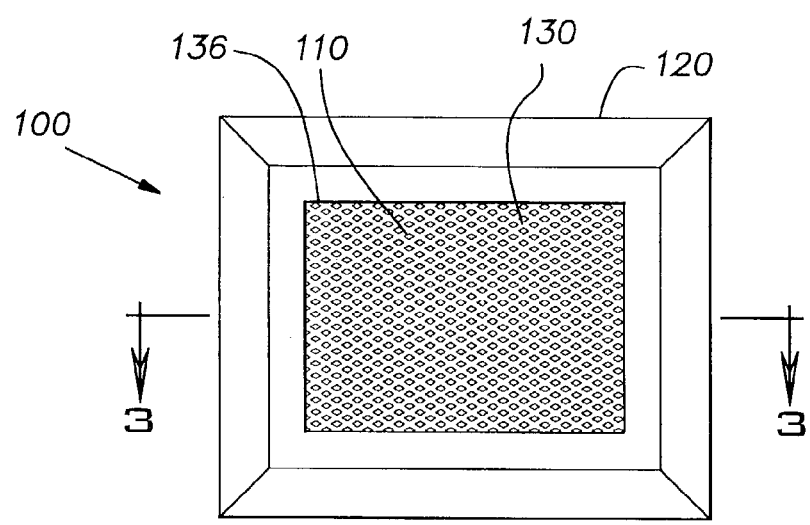
FIG. 1 is a schematic top plan view of an assembly in accordance with a first embodiment of the invention.
Figure 2:
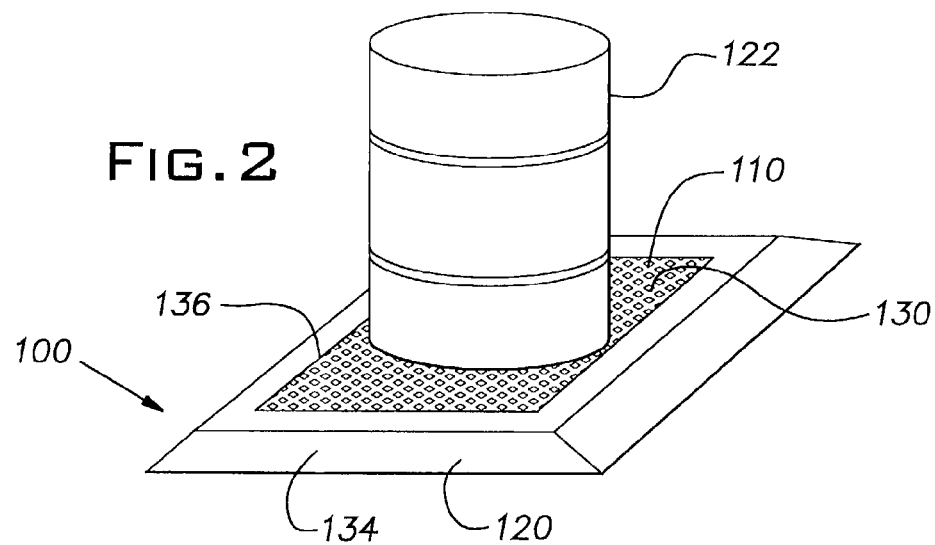
FIG. 2 is a schematic perspective view of the assembly shown in FIG. 1.
Figure 3:
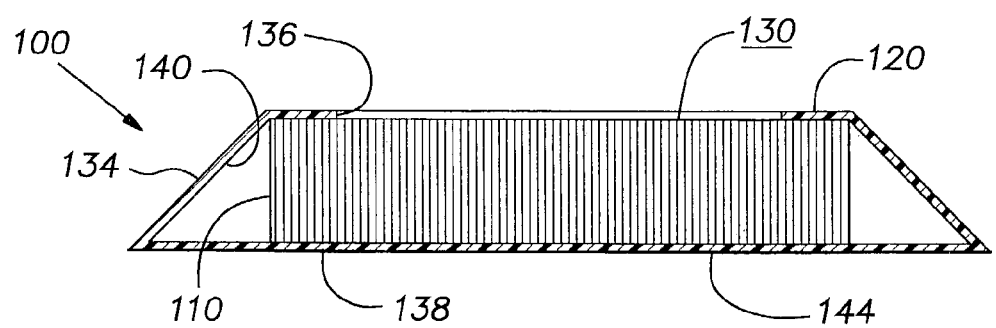
FIG. 3 is a schematic cross-sectional view of the assembly shown in FIG. 1 along the line 3—3.

With reference to FIGS. 1–3, a first embodiment of a spill containment assembly (SCA) 100 according to the present invention is shown. Fluid-filled vessels, drums and containers sit on the SCA 100 such that if the fluid contents of the vessels, drums and containers leak or spill, the SCA 100 receives and contains or temporarily stores the fluid.

The SCA 100 includes a support structure or grate 110 and a containment structure or bag 120. The grate 110 supports a fluid holding vessel, container or drum 122 (FIG. 2) over the bag 120 so that if the fluid spills or leaks from the drum 122, the fluid flows into the bag 120 to be contained or stored therein.

The grate 110 has a lattice-like structure so as to define a perforate or open top surface 130 on which the drum 122 is placed. While the illustrated embodiment is capable of holding a single drum or vessel, other alternative embodiments are larger or wider to support relatively more drums or vessels. Alternatively, the grate 110 can hold a larger number of smaller vessels. The grate 110 is non-corrosive plastic, however, other alternative embodiments include a grate that is reinforced thermoplastic or thermoset material, metal, wood, or the like. The perforate or honeycombed configuration of the grate 110 allows leaked or spilled fluid to flow into and through the grate 110. By varying the height and/or porosity of the grate 110, different available volumes of space are available inside the grate 110 so as to store correspondingly different quantities of leaked or spilled fluid.

The bag 120 is formed of a flexible fabric or sheet. Specifically, the bag 120 has a continuous sidewall 134 defining a grate opening 136, and a bottom 138 attached to the sidewall 134 along a peripheral edge so as to define an integral, fluid-tight or leak-proof structure. The sidewall 134 and bottom 138 have inner surfaces 140 that define a cup or bowl-shaped storage volume. The bag 120 is not self-supporting, but rather is flexible so as to collapse or fold for storage and shipping purposes.

The bottom 138 has an outer surface 144 in addition to the inner surface 140. The bottom outer surface 144 can be reinforced with abrasion resistant material to reduce the possibility of a tear or leak that may result from moving the SCA 100 across a floor, especially when the SCA 100 is filled with spill or leaked fluid. Alternatively, the bottom outer surface 144 can be provided with a gripping surface or a sliding surface. The gripping surface reduces the ability of the SCA 100 to slide across the floor, and the sliding surface performs an opposite function by increasing the ability of the SCA 100 to slide across the floor.

The flexible sheet that the bag 120 is formed of is a corrosion resistant flexible material, for example polyvinyl. Depending on the fluid type being stored in the drum 122, an appropriate alternative bag may be selected. The alternative bag may be formed of water resistant material, acid resistant material, ultraviolet radiation resistant material, corrosion resistant material, solvent resistant material, abrasion resistant material, heat resistant material, cold resistant material, and electrically non-conductive material in addition to, or in place of, the corrosion resistant polyvinyl bag 120 of this embodiment.

In yet other alternative embodiments, a bag has multiple plies of either the same material or a combination of materials that are different from each other. Accordingly, multipurpose bags having layers that are resistant to different fluids are provided as well as bags having multiple layers for reasons of containment redundancy and the like. In addition, alternative bags are reinforced with a rib, a cord or a thickened strip. The reinforced material is added, for example, to help the bags maintain desired shapes or to help prevent tears.

Figure 4:
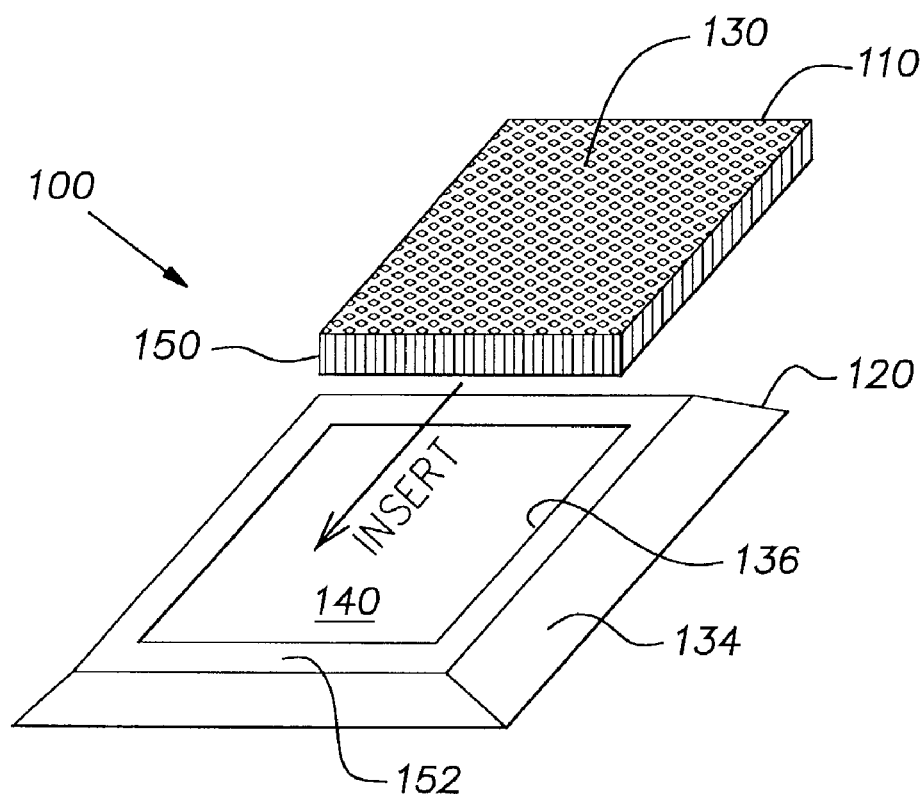
FIG. 4 is an exploded schematic view of the assembly, partially disassembled, shown in FIG. 1.

With reference to FIG. 4 and as described above, the grate 110 and the bag 120 are shipped in a disassembled state and assembled or reassembled on-site. To assemble the SCA 100, the grate 110 is oriented relative to the bag 120 so that the grate upper surface 130 is up and away from the bag 120. A lead edge 150 of the grate 110 is inserted through the grate opening 136 into the bag 120 in the direction indicated by the directional arrow labeled INSERT. The lead edge 150 is inserted into the volume of the bag 120 so that the lead edge 150 is under an upper flap portion 152 of the sidewall 134. The bag 120 is flexible so that the rest of the grate 110 follows the lead edge 150 the bag 120 and the sidewall 136 overlays a portion of the grate surface 130 at the grate peripheral edge. The so-assembled SCA 600 is thereafter available to receive one or more drums 122.

Figure 5:
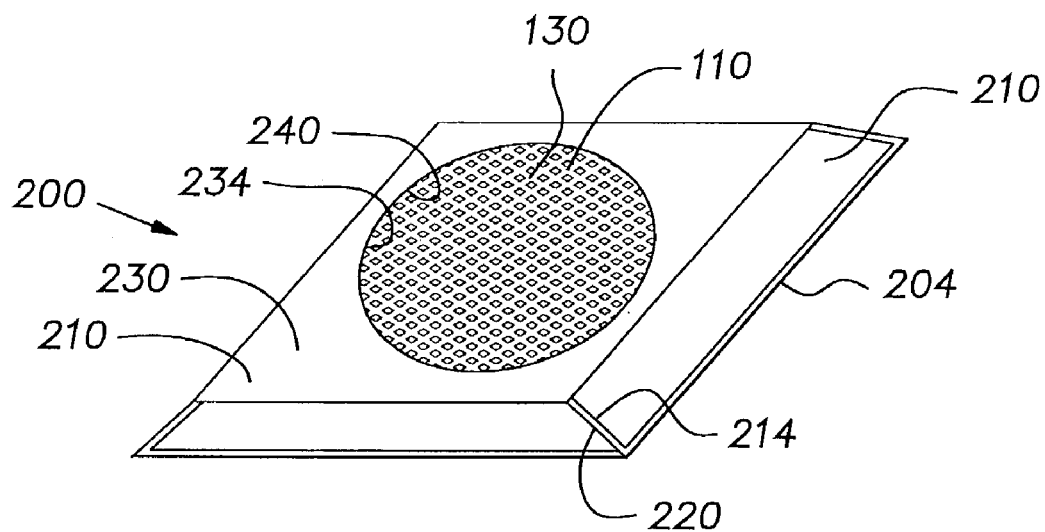
FIG. 5 is a schematic perspective view of an assembly in accordance with a second embodiment of the invention.

A spill containment assembly (SCA) 200 in accordance with a second embodiment of the invention is shown in FIG. 5. The SCA 200 includes many parts that are substantially the same as corresponding parts of the SCA 100; this is indicated by the use of the same reference numerals in FIGS. 1–4 and 5. The SCA 200 differs in that it has a bag 204 with sidewalls 210 that are sealed along portions of their peripheral edges 214 to form a continuous seam 220. Further, the sidewalls 210 have an upper flap portion 230 that has an inner edge 234 that defines a generally circular grate opening 240. Although the grate opening 240 is preferably circular, as illustrated, the present invention is not limited thereto. Rather, it is contemplated and considered apparent that the opening could be any shape that allows grate entry into the bag interior and receipt of one or more drums thereon.

The upper surface 130 of the grate 110 is accessible through the grate opening 240. The grate opening 240 has an inner diameter that is about the same as a width of the grate 110, and is larger than a width of the bottommost portion of the drum 122 that is to be placed or stored on the SCA 200. Thus, the drum 122 sitting on the SCA 200 would have its entire bottommost portion contacting the grate 110 and not contacting the upper flap portion 230 of the bag 204.

Figure 6:
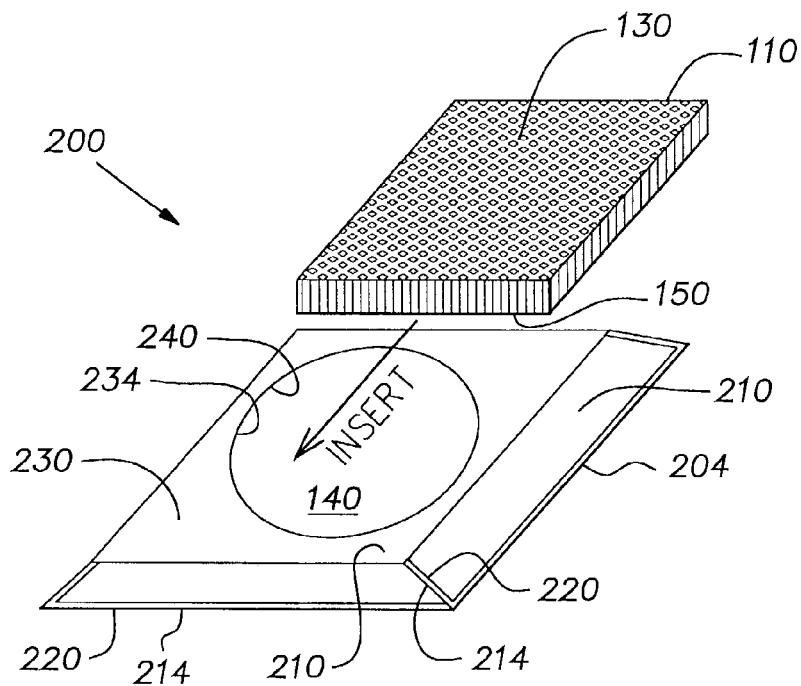
FIG. 6 is an exploded schematic view of the assembly, partially disassembled, shown in FIG. 5.

With reference to FIG. 6, the grate 110 and the bag 204 are shipped in a disassembled state and assembled or reassembled on-site. To assemble the SCA 200, the grate 110 is oriented relative to the bag 204 so that the grate upper surface 130 is up and away from the bag 204. The lead edge 150 of the grate 110 is inserted through the grate opening 240 into the bag 204 in the direction indicated by the directional arrow labeled INSERT so that the lead edge 150 is under the upper flap portion 230 of the sidewall 210. The bag 204 is flexible so that the rest of the grate 110 follows the lead edge 150 into the volume of the bag 204 and the upper flap portion 230 overlays a portion of the grate surface 130. The drum 122 is then placed and stored on the grate surface 130, as desired.

Figure 7:
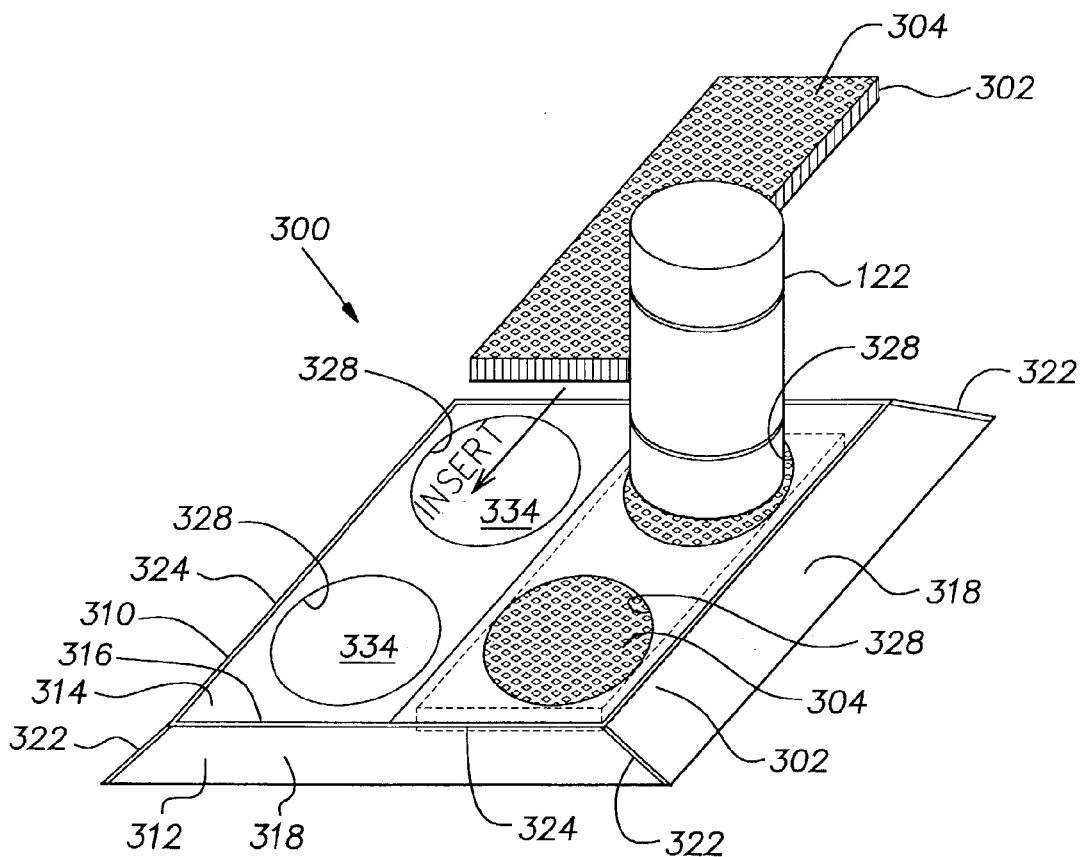
FIG. 7 is a schematic exploded perspective view of a partially disassembled assembly in accordance with a third embodiment of the present invention.

A spill containment assembly (SCA) 300 in accordance with a third embodiment of the invention is shown in FIG. 7. The SCA 300 differs from previously described embodiments in that it includes two grates 302 for use with a bag 310. The grates 302 each have a perforate upper surface and are similar to the grate 110 described hereinabove except that the grates 302 have a generally rectangular top profile rather than the generally square top profile of the grate 110 of previous embodiments.

The bag 310 has a bottom 312 and a top 314. The bottom 312 is a generally rectangular single piece of flexible material. The bottom 312 has edge portions 318 that fold upward relative to a flat bottom portion; the bottom portion has an inner surface 140. The bottom 312 has corner folds disposed in the interior of the bag 310 that are formed from part of the edge portions 318. The corner folds are sealed, preferably heat-sealed, along an edge so as to form a liquid tight and leak-proof seam 322.

The bottom 312 is secured to the top 314 by another seam 324 that is continuous along a peripheral edge 316 of the top 314 of the bag 310. The top 314 defines a plurality of apertures 328. There are four apertures 328 in this embodiment, however, by changing dimensions of the grates 302 and/or the bag 310, any practical number of desired apertures 328 could be achieved. The apertures 328 extend through the top 314 of the bag 310 to allow access from outside of the bag 310 to a volume defined by an inner surface 334 of the bag 310.

In the illustrated embodiment shown in FIG. 7, one of the two grates 302 of this embodiment is disposed inside the bag 310 and the other grate 302 is poised for insertion into the bag 310 so that both of the grates 302 will be side-by-side with each other and within the volume of the bag 310. The grates 302 each have a generally rectangular shape, as described hereinabove, so that in this embodiment, they form a generally square shape when side-by-side. In alternative embodiments, different grates form other shapes having different top profiles when arranged side-by-side, for example, a rectangle or a polygon top profile. Further, the grates 302 could be arranged end-to-end to create a relatively elongated four-drum spill containment assembly, if desired.

The drum 122 is placed on the grate upper surface 304 so that the bottommost portion of the drum 122 does not rest on the top 314 of the bag 310. Rather, the drum 122 extends through one of the apertures 328 to rest entirely on the grate upper surface. Accordingly, if the fluid contents of the drum 122 spill or leak from the drum 122, the fluid passes through the respective aperture 328, through the porous or perforate upper surface 304 of the grate 302 upon which the drum 122 rests, and into the volume of the bag 310. The fluid is stored in the volume of the bag 310 until it is desirable to remove the fluid.

Accordingly, in the first through third embodiments described hereinabove, the grate cooperates with the bag to define an available volume for storage of spilled liquids. The bag can be shipped and/or stored in the generally collapsed condition. The bag can then be easily assembled with the grate or grates for use as a spill containment assembly to collect and store spilled or leaked fluids from drums stored thereupon.

Figure 8:
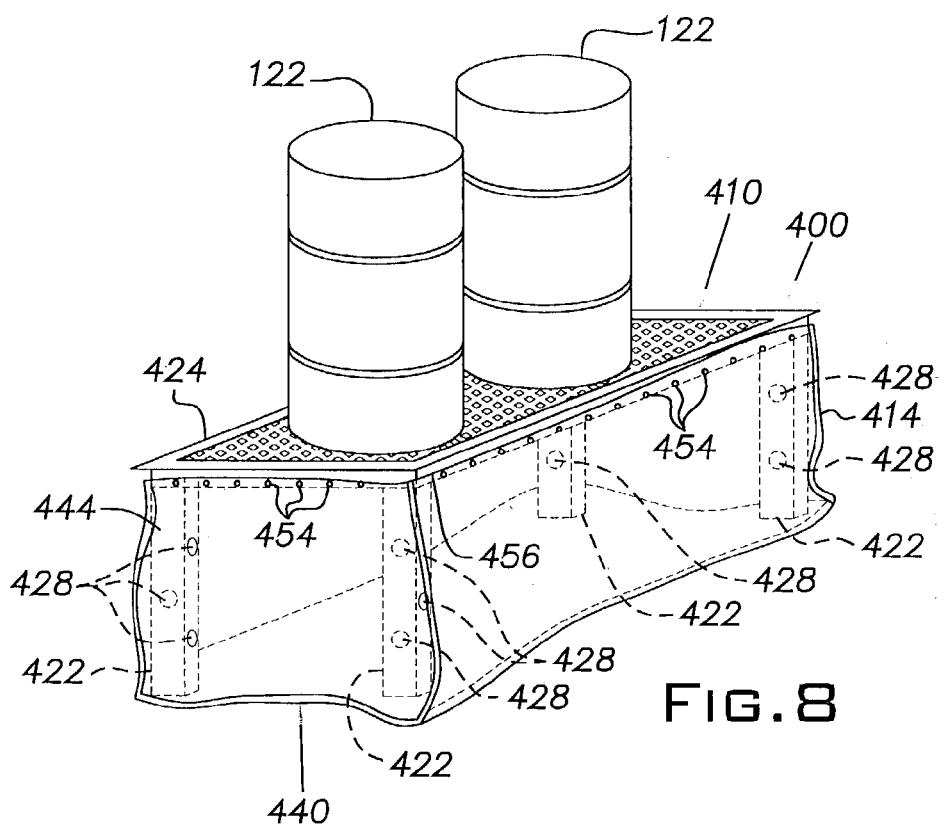
FIG. 8 is a perspective schematic view of an assembly in accordance with a fourth embodiment of the present invention.

A spill containment assembly (SCA) 400 in accordance with a fourth embodiment of the invention is shown in FIG. 8. The SCA 400 differs from previously described embodiments of the invention in that it includes a frame 410 rather than a grate only, and a bag 414 that secures to the grate and frame 410 to be supported thereby.

The frame 410 includes a plurality of legs 422 that support a rectangular grate 424. The grate 424 has a recess in each corner that receives one of the legs 422. The legs 422 preferably releasably secured to the grate 424 so that the grate 424 and legs 422 can be assembled or disassembled for shipping and storage.

The legs 422 and the grate 424 are formed from a non-corrosive material, such as plastic, to permit their use in situations where corrosive fluids may come in contact with the spill containment assembly 410. The legs 422 are hollow and define perforations or openings 428 in the sidewalls thereof to permit entry of fluid therein. The legs 422 have a length so that the spill containment vessel 400 provides an available storage volume. The storage volume defined by the bag 414 is at least 110% of a volume of any one of the drums 122 or is at least 50% of a total volume of the plurality of the drums 122 that are simultaneously stood in single depth on the grate 424.

The bag 414 includes a bottom portion 440 having an inner side and an outer side, and sidewalls 444 having inner sides and outer sides. The sidewalls 444 have a height that extends from the bottom portion 440 to an edge of the grate 424. The sidewalls 444 and the bottom portion 440 are sealed along their peripheral edges to form a fluid tight or leak-proof seam 446.

Snap fasteners 454 secure the bag 414 to the grate 424. The array of fasteners 454 is arranged such that first portions of the fasteners 454 are disposed along an upper edge 456 of the sidewalls 444 and corresponding second portions of the fasteners 454 are disposed along the peripheral edge of the grate 424. The portions removably attach the upper edge 456 to the frame 410 so that the sidewalls 444 of the bag 414 are secured to the grate 424 by the fasteners 454.

During assembly, the legs 422, the grate 424 and the bag 414 are placed on a floor surface in a location desired for use of the SCA 400. The bag 414 is spread out on the floor with the bottom 440 inner-surface facing upward.

The legs 422 are positioned in the corner recesses of the grate 424 so that the assembled frame is generally table-shaped. The legs 422 rest on the bottom 440 inner surface of the bag 414.

The sidewalls 444 of the bag 414 are pulled upward outside of the legs 422 so that the bag 414 surrounds the peripheral top edge 456 of the sidewalls 444 and is adjacent to about the top of the legs 422 and the grate 424 resting thereon. The top edge 456 of the bag 414 is affixed to the grate 424 by snapping the first and second fastener portions together so as to maintain the bag 414 in a deployed, supported condition.

Accordingly, the bag 414 defines a bowl-shaped reservoir or volume underneath and directly below the grate 424. Fluid that leaks or spills from vessels placed on the grate 424 flows through the perforate grate 424 and into the bag 414 for storage.

Figure 9:
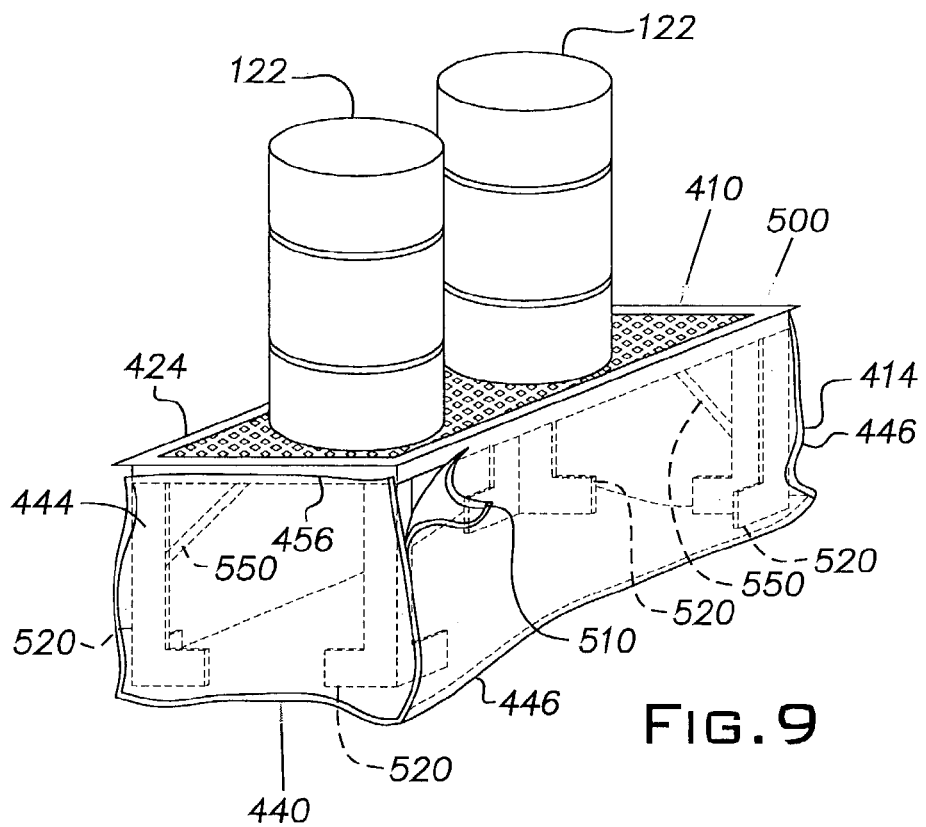
FIG. 9 is a perspective schematic view of an assembly in accordance with a fifth embodiment of the present invention.

With reference to FIG. 9, a spill containment assembly 500 in accordance with a fifth embodiment of the invention is shown. The assembly 500 has many parts that are substantially the same as corresponding parts of the SCA 400; this is indicated by the use of the same reference numbers in FIGS. 8 and 9. The assembly 500 differs in that instead of having the snap-type fasteners 454, a hook-and-loop type fabric attachment structure 510 is used, and instead of the perforate legs 422, T-shaped legs 520 are used. Alternatively, legs may be L-shaped or U-shaped in cross-section so as to provide an increased available volume for receipt of fluids.

A suitable hook-and-loop type fabric attachment structure 510 is commercially available under the VELCRO trademark. The fabric structure 510 has a part that extends along the inner periphery of the sidewalls 444 and a cooperating part that extends over a portion of the outside of the grate 424. In FIG. 9, a portion of one of the sidewalls 444 is peeled back to illustrate the arrangement of the corresponding parts of the fabric structure 510.

Two cross supports 550 each attach to a respective one of the legs 520 and to the grate 424. The cross supports 550 brace and stiffen the frame 410. In alternative embodiments, each of the legs 520 has a respective cross support or a plurality of cross supports.

During assembly, the legs 520 are positioned over the collapsed and unsupported bag 414. The legs 520 are attached to the grate 424 to assemble the frame 410, which is on the inner surface of the bottom portion 440 of the bag 410. The cross supports 550 are secured to the respective legs 520 and to the grate 424.

The sidewalls 444 are pulled up so that the sidewalls peripheral edge 456 is about the height of the grate 424. The corresponding parts of the fabric structure 510 are adjacent each other and the legs 520 of the assembled frame 410 are disposed within the volume defined by the bag 414. The fabric structure 510 parts are fastened to each other so as to attach the bag 414 to the frame 410. The supported bag 414 has a cup or bowl-shaped configuration and is attached to and supported by the frame 410 to form the spill containment assembly 500. The open end of the bag 414 is positioned under the grate 424. Fluid containing drums 122 are placed upon the grate 424 as desired. If the fluid content of the drums 122 spills or leaks from the drums 122, the fluid flows down through the grate 424 and is contained in the volume defined by the supported bag 414.

Figure 10:
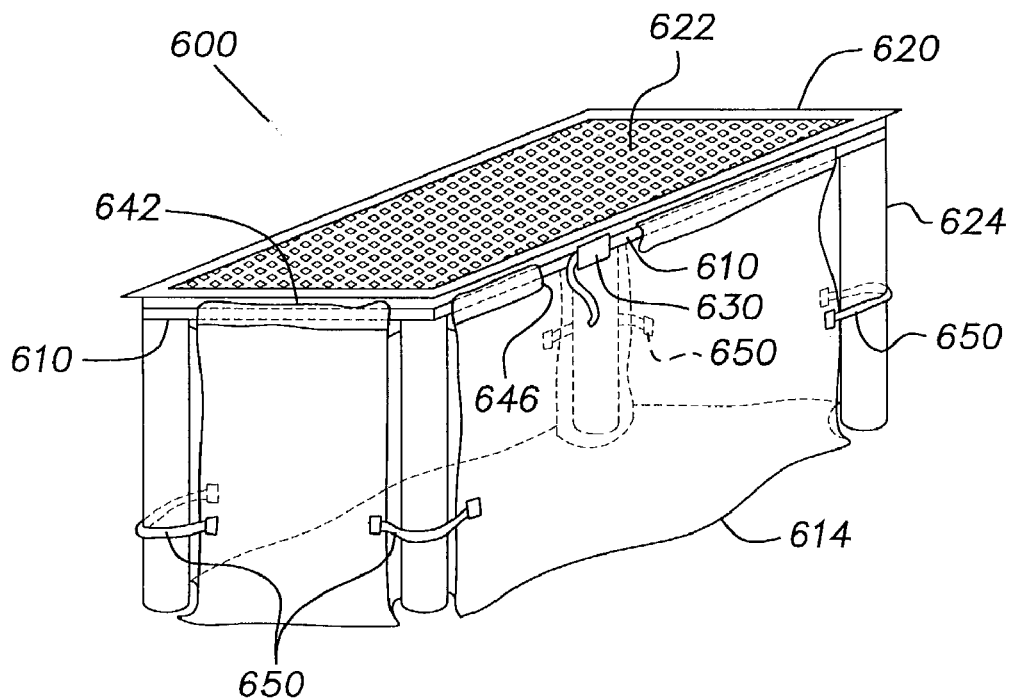
FIG. 10 is a perspective schematic view of an assembly in accordance with a sixth embodiment of the present invention.

An assembly 600 in accordance with a sixth embodiment of the invention is shown in FIG. 10. The assembly 600 differs from previously described embodiments in that a strap 610 cinches a bag 614 to a frame 620. The frame 620 includes a grate 622 supported by tubular legs 624 that are disposed outside of the bag 614 when assembled.

In particular, an upper portion 642 of sidewalls 644 defines sleeves 646 in which the strap 610 is received. One end of the strap 610 is attached to a buckle 630, while the other end of the strap 610 passes through the buckle 630. The buckle 630 includes a one-way latch-type mechanism whereby the strap 610 can be tightened around the frame 620 (i.e., around the grate 624) and maintained in a tightened condition. The buckle 630 is loosened by pulling up on the latch-type mechanism, as is known in the art. Preferably, the grate 622 defines a groove around its peripheral edge that receives the strap 610.

As described hereinabove, the bag 614 is supported by the frame 620 directly beneath the grate 622. The legs 624 are disposed outside of the bag 614, that is, outside of the volume defined by the bag 614, to rest directly on the floor.

A plurality of fasteners 650, for example flexible straps, attaches to the bag 614 and extend out and around respective legs 624. The fasteners 650 provide additional support for the bag 614.

During assembly of the spill containment assembly 600, the legs 624 attach to the grate 622 to form the frame 620. The strap 610 is threaded through the pockets 646 and further through to the buckle 630. The bag 614 is positioned beneath the frame 620 and the edge 642 of the bag 614 is aligned with the peripheral edge of the grate 622. Thus, the strap 610 in the pocket 646 is received within the groove defined by the edge of the grate 622, if the groove is present. The strap 610 is cinched tight against the grate 622 to secure the bag 614 thereto. The bag 614 thus assumes a supported cup or bowl-shape with the open end positioned directly below the grate 622. The fasteners 650 help secure the bag 614 to the frame 620.

Fluid filled drums or vessels are placed on the grate 622. Fluid leaking or spilling from the drums or vessels passes through the perforate grate 622 and into the volume of the bag 614 and the fluid is contained therein.

Figure 11:
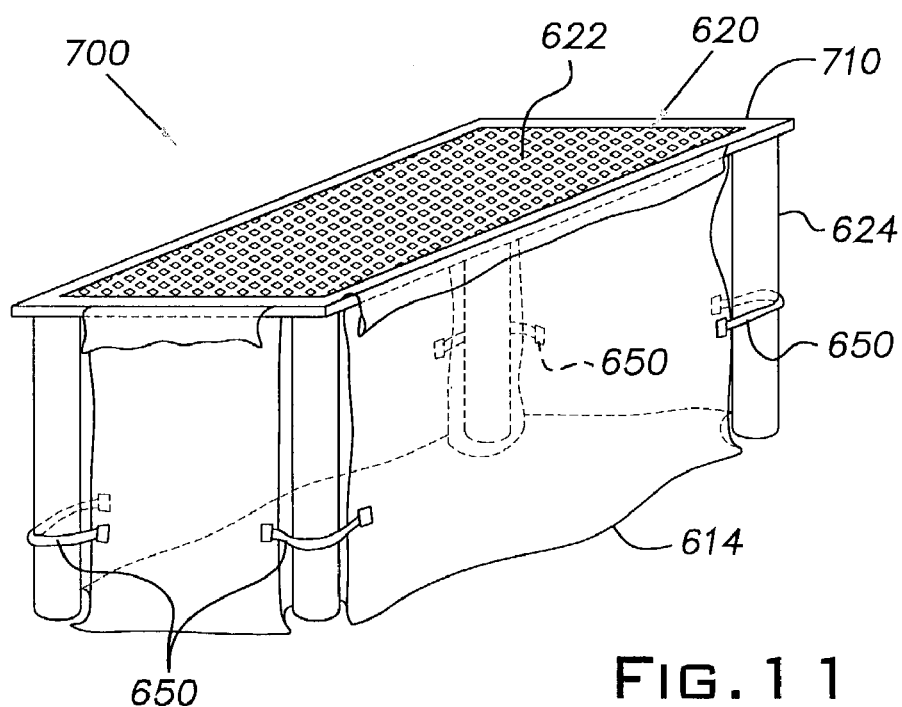
FIG. 11 is a perspective schematic view of an assembly in accordance with a seventh embodiment of the present invention.

A spill containment assembly 700 in accordance with a seventh embodiment of the invention is shown in FIG. 11. The assembly 700 has many parts that are substantially similar to the SCA 600; this is indicated by the use of the same reference numbers in FIGS. 10 and 11. The assembly 700 differs in that instead of the pockets 646 and the strap 610 to hold the bag 614 to the frame 620, the assembly 700 has a frame clamp 710 that clamps the bag 614 to the grate 622.

The frame clamp 710 is a continuous, hollow rectangular member that has an inner width slightly larger than the outer width of the grate 622. The frame clamp 710 is placed around the peripheral edge of the grate 622 so as to be clamped thereto. The bag 614 has an edge flap portion 720 that extends between the frame clamp 710 and the peripheral edge of the grate 622. Thus, clamping the frame clamp 710 to the grate 622 clamps and secures the bag 614 to the frame 620. Fasteners, such as screws, bolts, catches, snaps, pins, and the like, may optionally be used to secure the frame clamp 710, the grate 622 and the bag 614 together.

In alternative embodiments, other frame clamps are hingedly attached to the frame 620. And, in other alternative embodiments, frame clamps can be disassembled into components so that individual components attach to the frame 620. For example, four separate parts of the frame clamp bolt to the grate 622, one part to each side.

In yet other alternative embodiments, mechanical devices other than frame clamps releasably secure bags to frames. For example, upper ends of bag sidewalls include reinforced openings or pockets that permit hooks, plastic or metal straps (cable ties), or other lashing-type attachment devices to extend therethrough to secure the sidewalls of the bags to the frames. Receivers for the lashing or hook-type attachment are provided by the frame. In other alternative embodiments, suitable mechanical devices include band-type clamps, bayonet fasteners, resilient fasteners, snaps, and zippers.

In addition to fluid filled vessels, embodiments according to the invention are suitable for use with powder filled vessels and bags. Preferably, grate perforations are sufficiently large to allow spilled or leaked powder to flow or sift through the grate and into a containment bag secured to the grate. The grates for use with fluid or with powder in accordance with the invention are known to those of ordinary skill in the art, and other suitable grates as known in the art are interchangeable therewith. In yet other alternative embodiments, a spill containment assembly is electrically groundable or electrostatically dispersive (ESD), so that the grate, the legs (if present) and the bag have a reduced chance of allowing a spark.

The embodiments described herein are examples of structures, methods, and systems having elements corresponding to the elements of the invention recited in the claims. This written description may enable those skilled in the art to make and use embodiments having alternative elements that likewise correspond to the elements of the invention recited in the claims. The intended scope of the invention thus includes other structures, methods and systems that do not differ from the literal language of the claims, and further includes other structures, methods, and systems with insubstantial differences from the literal language of the claims.

What is claimed is:

1. A spill containment assembly for containing fluid spilled or leaked from a vessel, comprising:

a flexible bag having a bottom and a sidewall that cooperate to define a volume, the bag sidewall having an upper flap portion that defines an opening, wherein said flexible bag is non-self supporting such that said sidewall and upper flap portion normally collapse onto said bottom and rest upon said bottom; and a rigid grate having a perforated structure including a perforate upper surface and a perforate lower surface, said grate being sized and adapted to be inserted into said flexible bag via said opening in the upper flap portion, and wherein, once said grate is received within the bag, said grate occupies a portion of said bag volume, said upper flap portion rests upon a peripheral portion of the grate upper surface, and said grate lower surface rests upon the bag bottom such that said grate supports said upper flap portion and said sidewall in a spaced relation to said bag bottom and thereby renders a remaining portion of said bag volume available to receive fluid, said grate upper surface being exposed and accessible via said opening such that the vessel may be disposed on the grate upper surface so as to extend above said bag opening, said grate perforated structure allowing fluid spilled or leaked from the vessel to flow into the grate, from the upper surface toward the lower surface, while said bag contains such leaked or spilled.

2. The assembly as defined in claim 1, wherein the grate is one of a plurality of grates that are received in the bag.

3. The assembly as defined in claim 1, wherein the grate is disposed entirely within the volume defined by the bag.

4. The assembly as defined in claim 1, wherein the bag is formed from a single sheet of flexible material having folded corners so as to define a bowl-shape.

5. The assembly as defined in claim 1, wherein the bag is formed of polyvinyl plastic.

6. The assembly as defined in claim 1, wherein the bag is formed of a material that is selected from the group consisting of water resistant material, acid resistant material, ultraviolet radiation resistant material, corrosion resistant material, solvent resistant material, abrasion resistant material, heat resistant material, cold resistant material, electrically non-conductive material, and electrostatically dispersive material, and combinations thereof.

7. The assembly as defined in claim 1, wherein the bag comprises a first layer of material and second layer of material, the second layer being coextensive with at least a portion of the first layer.

8. The assembly as defined in claim 1, wherein the bag comprises a reinforcement structure selected from the group consisting of a rib, a cord and a thickened strip.

9. The assembly as defined in claim 1, further comprising a gripping surface, a sliding surface or an abrasion resistant surface disposed on an outer surface of the bottom of the bag.

10. A spill containment assembly in combination with a vessel, said spill containment assembly being adapted to support the vessel and contain fluid spilled or leaked from the vessel, comprising:
   a flexible bag having a bottom and a sidewall that cooperate to define a volume, the bag sidewall having an upper flap portion that defines an opening, wherein said flexible bag is non-self supporting such that said sidewall and upper flap portion normally collapse onto said bottom and rest upon said bottom; and
   a grate having a perforated structure including a perforate upper surface and a perforate lower surface, said grate being sized and adapted to be inserted into said flexible bag via said opening in the upper flap portion, and wherein, once said grate is received within the bag, said grate occupies a portion of said bag volume, said upper flap portion rests upon a peripheral portion of the grate upper surface, and said grate lower surface rests upon the bag bottom such that said grate supports said upper flap portion and said sidewall in a spaced relation to said bag bottom and thereby renders a remaining portion of said bag volume available to receive fluid, said grate upper surface being exposed and accessible via said opening,
   wherein said vessel is disposed on the grate upper surface and supported thereby so as to extend above said bag opening, said grate perforated structure allowing fluid spilled or leaked from the vessel to flow through the opening into the grate, from the upper surface toward the lower surface, while said bag contains such leaked or spilled fluid.

11. The combination as defined in claim 10, wherein the grate is one of a plurality of grates that are received in the bag.

12. The combination as defined in claim 10, wherein the grate is disposed entirely within the volume defined by the bag.

13. The combination as defined in claim 10, wherein the bag is formed from a single sheet of flexible material having folded corners so as to define a bowl-shape.

14. The combination as defined in claim 10, wherein the bag is formed of polyvinyl plastic.

15. The combination as defined in claim 10, wherein the bag is formed of a material that is selected from the group consisting of water resistant material, acid resistant material, ultraviolet radiation resistant material, corrosion resistant material, solvent resistant material, abrasion resistant material, heat resistant material, cold resistant material, electrically non-conductive material, and electrostatically dispersive material, and combinations thereof.

16. The combination as defined in claim 10, wherein the bag comprises a first layer of material and second layer of material, the second layer being coextensive with at least a portion of the first layer.

17. The combination as defined in claim 10, wherein the bag comprises a reinforcement structure selected from the group consisting of a rib, a cord and a thickened strip.

18. The combination as defined In claim 10, further comprising a gripping surface, a sliding surface or an abrasion resistant surface disposed on an outer surface of the bottom of the bag.

* * * * *

UNITED STATES PATENT AND TRADEMARK OFFICE
CERTIFICATE OF CORRECTION

| | | |
|---|---|---|
| PATENT NO. | : 7,234,608 B2 | Page 1 of 1 |
| APPLICATION NO. | : 10/368849 | |
| DATED | : June 26, 2007 | |
| INVENTOR(S) | : Reed et al. | |

It is certified that error appears in the above-identified patent and that said Letters Patent is hereby corrected as shown below:

Column 8, Line 42 (Claim 1, Line 28), after "spilled", insert --fluid--.

Signed and Sealed this

Sixteenth Day of October, 2007

JON W. DUDAS
*Director of the United States Patent and Trademark Office*